(12) United States Patent
Akkarakaran et al.

(10) Patent No.: US 11,558,876 B2
(45) Date of Patent: Jan. 17, 2023

(54) COMMUNICATION OF A KNOWN PAYLOAD TO SUPPORT A MACHINE LEARNING PROCESS

(71) Applicant: QUALCOMM Incorporated, San Diego, CA (US)

(72) Inventors: Sony Akkarakaran, Poway, CA (US); Tao Luo, San Diego, CA (US); Hamed Pezeshki, San Diego, CA (US); Jingchao Bao, San Diego, CA (US); Taesang Yoo, San Diego, CA (US); Wooseok Nam, San Diego, CA (US); Ajay Gupta, San Diego, CA (US); Vinod Viswanatha Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/166,761

(22) Filed: Feb. 3, 2021

(65) Prior Publication Data

US 2021/0266908 A1 Aug. 26, 2021

Related U.S. Application Data

(60) Provisional application No. 62/979,307, filed on Feb. 20, 2020.

(51) Int. Cl.
*H04W 72/04* (2009.01)
*H04W 76/27* (2018.01)
(Continued)

(52) U.S. Cl.
CPC ........ *H04W 72/0493* (2013.01); *G06N 20/00* (2019.01); *H04L 1/0008* (2013.01);
(Continued)

(58) Field of Classification Search
CPC ........... H04W 72/0493; H04W 72/042; H04W 72/0466; H04W 72/14; H04W 74/0816;
(Continued)

(56) References Cited

U.S. PATENT DOCUMENTS

2017/0324502 A1* 11/2017 Wang ................. H04J 11/00
2019/0289615 A1* 9/2019 Lee .................... H04W 92/18
(Continued)

OTHER PUBLICATIONS

IEEE—Toward Massive Machine Type Communications in Ultra-Dense Cellular IoT Networks: Current Issues and Machine Learning-Assisted Solutions. Shree Krishna Sharma, Senior Member, IEEE, and Xianbin Wang, Fellow, IEEE. Publication date: May 10, 2019. (Year: 2019).*

(Continued)

*Primary Examiner* — Mohammed S Chowdhury
(74) *Attorney, Agent, or Firm* — Harrity & Harrity LLP

(57) ABSTRACT

Various aspects of the present disclosure generally relate to wireless communication. In some aspects, a user equipment may receive, from a base station, an indication of a resource allocation for a data communication having a known payload, the known payload comprising data associated with a machine learning process; and communicate with the base station based at least in part on the resource allocation. Numerous other aspects are provided.

30 Claims, 6 Drawing Sheets

(51) Int. Cl.
　　　*H04W 72/14*　　(2009.01)
　　　*H04L 1/00*　　　(2006.01)
　　　*G06N 20/00*　　(2019.01)
　　　*H04W 74/08*　　(2009.01)
　　　*H04W 80/02*　　(2009.01)

(52) U.S. Cl.
　　　CPC ..... *H04W 72/042* (2013.01); *H04W 72/0466* (2013.01); *H04W 72/14* (2013.01); *H04W 74/0816* (2013.01); *H04W 76/27* (2018.02); *H04W 80/02* (2013.01)

(58) Field of Classification Search
　　　CPC . H04W 76/27; H04W 80/02; H04W 72/0406; G06N 20/00; G06N 3/08; H04L 1/0008
　　　See application file for complete search history.

(56) References Cited

U.S. PATENT DOCUMENTS

| | | | |
|---|---|---|---|
| 2019/0356516 A1* | 11/2019 | Cao | H04L 25/0256 |
| 2020/0045615 A1 | 2/2020 | Karimli et al. | |
| 2021/0050955 A1* | 2/2021 | Park | H04W 72/042 |
| 2021/0084644 A1* | 3/2021 | Bae | H04L 5/0053 |
| 2021/0176758 A1* | 6/2021 | Bae | H04L 1/1819 |
| 2022/0070896 A1* | 3/2022 | Wong | H04W 72/1268 |
| 2022/0104251 A1* | 3/2022 | Noh | H04W 74/0816 |
| 2022/0124815 A1* | 4/2022 | Kim | H04W 74/0833 |

OTHER PUBLICATIONS

International Search Report and Written Opinion—PCT/US2021/016623—ISA/EPO—dated Jun. 6, 2021.

* cited by examiner

COMMUNICATION OF A KNOWN PAYLOAD TO SUPPORT A MACHINE LEARNING PROCESS

CROSS-REFERENCE TO RELATED APPLICATION

This Patent application claims priority to U.S. Provisional Patent Application No. 62/979,307, filed on Feb. 20, 2020, entitled "COMMUNICATION OF A KNOWN PAYLOAD TO SUPPORT A MACHINE LEARNING PROCESS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for communication of a known payload to support a machine learning process.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication may include a memory and one or more processors operatively coupled to the memory. The memory and the one or more processors may be configured to receive, from a base station, an indication of a resource allocation for a data communication having a known payload, the known payload comprising data associated with a machine learning process; and communicate with the base station based at least in part on the resource allocation.

In some aspects, a base station for wireless communication may include a memory and one or more processors operatively coupled to the memory. The memory and the one or more processors may be configured to transmit, to a UE, an indication of a resource allocation for a data communication having a known payload, the known payload comprising data associated with a machine learning process; and communicate with the UE based at least in part on the resource allocation.

In some aspects, a method of wireless communication, performed by a UE, may include receiving, from a base station, an indication of a resource allocation for a data communication having a known payload, the known payload comprising data associated with a machine learning process; and communicating with the base station based at least in part on the resource allocation.

In some aspects, a method of wireless communication, performed by a base station, may include transmitting, to a UE, an indication of a resource allocation for a data communication having a known payload, the known payload comprising data associated with a machine learning process; and communicating with the UE based at least in part on the resource allocation.

In some aspects, a non-transitory computer-readable medium may store one or more instructions for wireless communication. The one or more instructions, when executed by one or more processors of a UE, may cause the one or more processors to receive, from a base station, an indication of a resource allocation for a data communication having a known payload, the known payload comprising data associated with a machine learning process; and communicate with the base station based at least in part on the resource allocation.

In some aspects, a non-transitory computer-readable medium may store one or more instructions for wireless communication. The one or more instructions, when executed by one or more processors of a base station, may cause the one or more processors to transmit, to a UE, an indication of a resource allocation for a data communication having a known payload, the known payload comprising data associated with a machine learning process; and communicate with the UE based at least in part on the resource allocation.

In some aspects, an apparatus for wireless communication may include means for receiving, from a base station, an indication of a resource allocation for a data communication having a known payload, the known payload comprising data associated with a machine learning process; and means for communicating with the base station based at least in part on the resource allocation.

In some aspects, an apparatus for wireless communication may include means for transmitting, to a UE, an indication of a resource allocation for a data communication having a known payload, the known payload comprising data associated with a machine learning process; and means for communicating with the UE based at least in part on the resource allocation.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
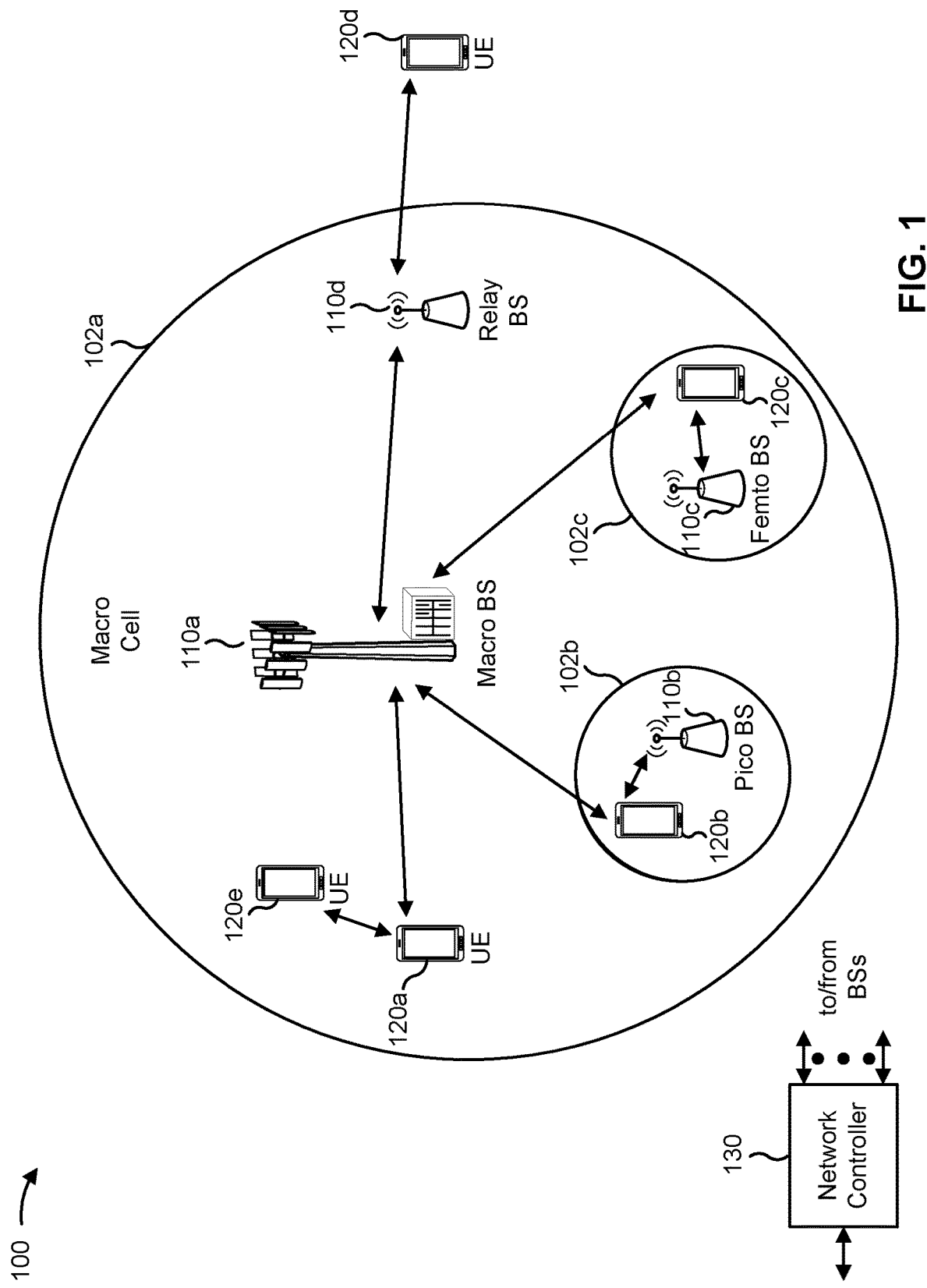
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
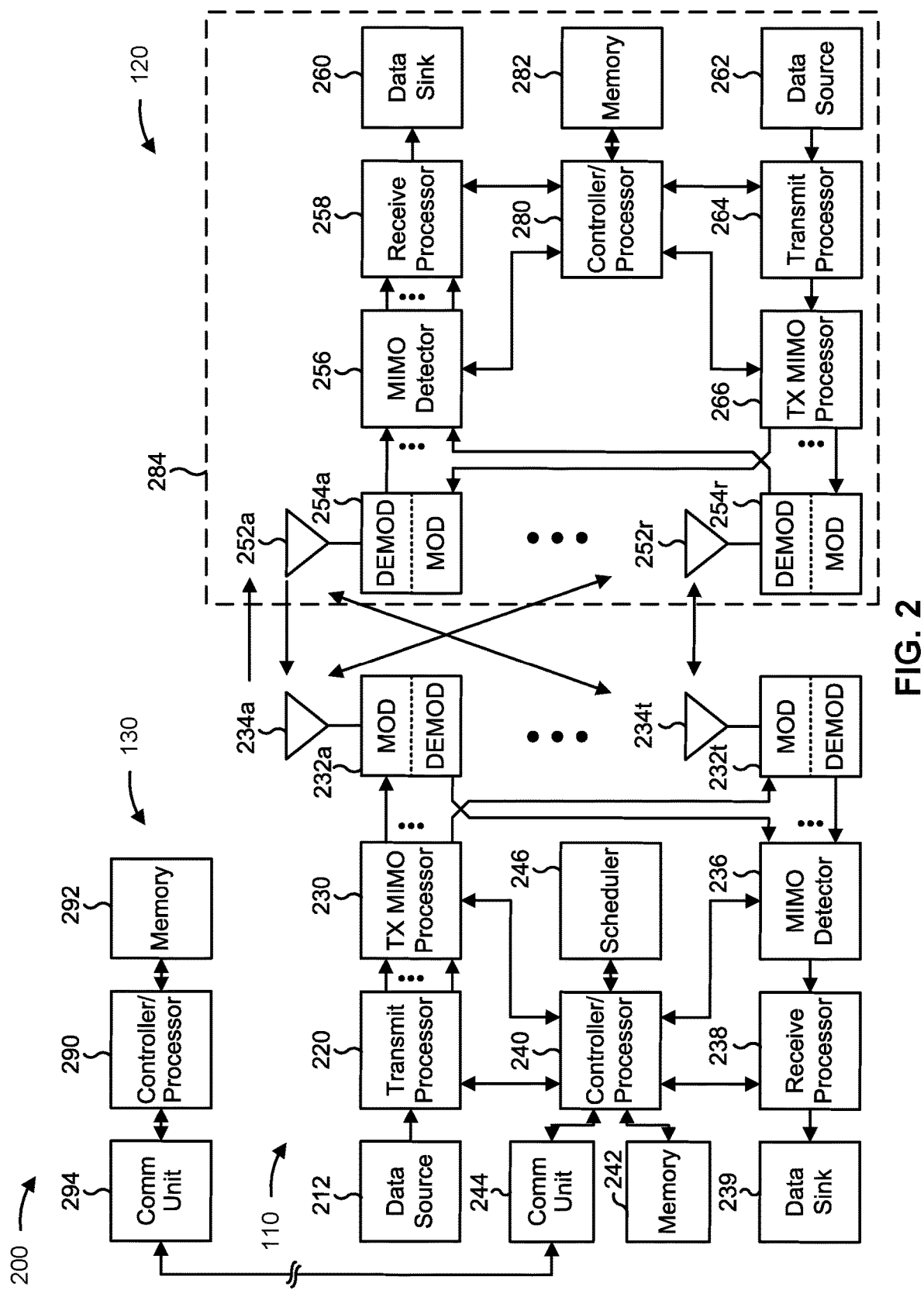
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with communication of a known payload to support a machine learning process, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving, from a base station, an indication of a resource allocation for a data communication having a known payload, the known payload comprising data associated with a machine learning process, means for communicating with the base station based at least in part on the resource allocation, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, an indication of a resource allocation for a data communication having a known payload, the known payload comprising data associated with a machine learning process, means for communicating with the UE based at least in part on the resource allocation, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some wireless networks, one or more network nodes may be configured to run machine learning (ML) processes. The ML processes may be used to establish, enhance, and/or otherwise support functions that the node or nodes are to perform. A machine learning model may be trained using a set of observations. The set of observations may be obtained and/or input from historical data, such as data gathered during one or more processes described herein. For example, the set of observations may include data gathered from transmissions of known payloads, as described elsewhere herein. In some implementations, the machine learning system may receive the set of observations (e.g., as input) from another network device such as a UE or a base station.

A feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from a UE and/or base station. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from a UE and/or a base station, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

The set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

In some aspects described herein, an ML process may be utilized to develop a neural network, using supervised learning. A neural network may be a model that includes connected nodes arranged in layers. Weights and biases may be assigned to the connections. A weight influences how much a given node activates a node in the next layer. A bias is a threshold that can help weed out activations that may give false positives.

In some aspects, the neural network may be used for processing received MIMO signals. ML processes may include the building of algorithms and/or models and may run on UEs, BSs, and/or jointly across UEs and BSs (e.g., in the case of distributed algorithms, and/or the like). While neural networks may be trained offline, the neural networks may additionally, or alternatively, be configured to be trained using known wireless network transmissions as training data to fine-tune the models with regard to network channels, noise, and/or other environmental characteristics.

A generalized neural network for use as a MIMO demapper may be represented, for example, as y=Hx+n, where y is the received vector, x is the transmitted symbol vector, n is the noise vector, and finally H is the channel matrix. The neural network may be trained offline to determine $\hat{x}$ (estimated symbols) and may benefit from being fine-tuned using online training. The inputs of the neural network may be received observations (y), and estimated channel matrix (H), and the outputs may be detected transmitted symbols, $\hat{x}$. To perform online training, the neural network may be provided with the ground truth labels ($\hat{x}$), and training data, in the form of transmissions having known payloads (e.g., data that the device is aware of or that can be regenerated by the device) may be sent to the device (e.g., UE and/or BS) on which the ML model is implemented. The received observations, y, as well as the estimated channel matrix (H) may be the inputs to the neural network, and the known payload ($\hat{x}$) may be the output (ground truth labels). This way the device (UE or gNB) can perform further online training, without having to decode y to use the decoded $\hat{x}$ as the ground truth labels for the neural network. Because the payloads are known, the neural network can use the training data to learn how to interpret the symbols in the presence of channel characteristics, noise characteristics, and/or the like.

Training data may include, for example, known reference signals; known payloads of physical downlink control channel (PDCCH) transmissions, physical uplink control channel (PUCCH) transmissions, physical downlink shared channel (PDSCH) transmissions, physical uplink shared channel (PUSCH) transmissions; periodically repeating system information blocks; usual unicast transmissions; and/or the like. Regular data transmissions such as those indicated above may be treated as known once they have been decoded. However, this approach may require excessive memory and computation overhead. For example, received modulation symbols may need to be stored until decoding completes.

In some aspects, techniques and apparatuses are provided for communication of a known payload to support an ML process (e.g., a process for training a neural network). In some aspects, a UE may receive, from a BS, an indication of a resource allocation for a data communication having a known payload and communicate with the BS based at least in part on the resource allocation. In this way, the UE and BS may both coordinate information regarding which transmissions will include the known payload, so that the receiving node (UE and/or BS) can receive the transmissions and process the data contained therein (e.g., use the payload data for an ML process) without decoding the transmissions.

In some aspects, the known payload may be generated based on a scrambling seed configured using radio resource control (RRC) messages. The scrambling seed may generate bits for an encoding process so that the known payload transmissions can be treated more like reference signals than data packets. In this way, the network nodes may be able to process the transmitted data without decoding signals. In some aspects, the known payload may be transmitted using a dedicated logical channel that includes assigned priority rules and multiplexing restrictions, so that receiving network nodes may be aware that the transmissions include known payload data. In some aspects, for example, transmissions of the dedicated logical channel may be prohibited from being multiplexed with any other logical channel, so that the known aspect of the data is not corrupted.

In some aspects, known payload transmissions may be assigned a lowest priority as compared to other types of transmissions, so that the transmission of known payloads to support ML processes does not interrupt the regular flow of network traffic. In some aspects, multiple dedicated logical channels for transmitting known payloads for ML processes may be defined and may be assigned priority relative to one another (e.g., based on logical channel identifiers (IDs), and/or the like). In some aspects, specifications may prohibit transmission of uplink control information (UCI) on PUSCH transmissions that include known payloads, so that known payload transmissions are not obscured by UCI. In some aspects, exceptions to known payload transmissions having a lowest priority may be made in cases where an ML model is out of date or exhibiting performance that fails to satisfy a performance threshold. In this way, to the extent that known payload transmissions may facilitate maintenance of the regular flow of network traffic, the transmissions may be prioritized.

Figure 3:
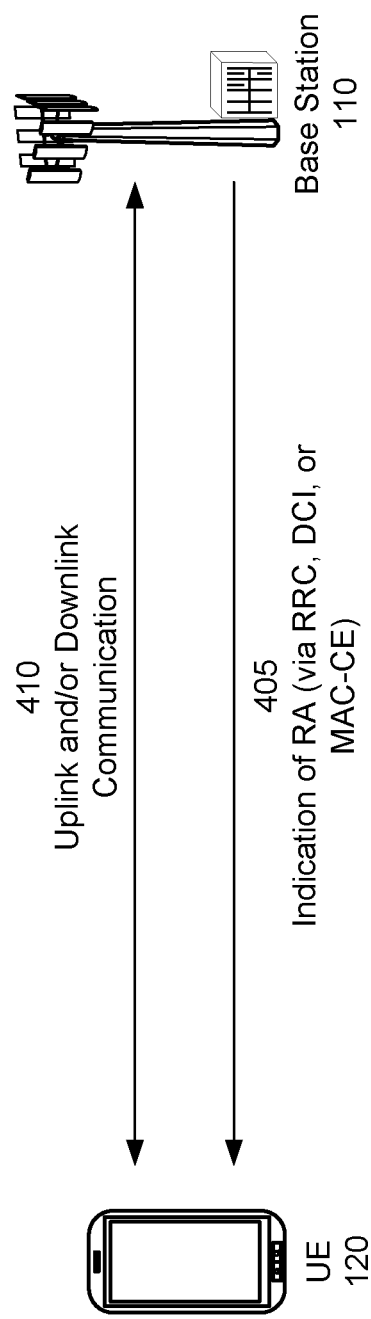
FIG. 3 is a diagram illustrating an example of communication of a known payload to support a machine learning process, in accordance with various aspects of the present disclosure.

FIG. 3 is a diagram illustrating an example 300 of communication of a known payload to support a machine learning process, in accordance with various aspects of the present disclosure. As shown, a BS 110 and a UE 120 may communicate with one another.

As shown by reference number 305, the BS 110 may transmit, and the UE 120 may receive, an indication of a resource allocation for a data communication having a known payload. The known payload may include data associated with a machine learning process, as described above. In some aspects, for example, the neural network associated with the BS 110 and/or UE 120 may go through an offline training phase in order to find the weights and biases of the neural network. The neural network may be deployed in another environment (e.g., a wireless network) which is different from the offline environment. The transmission of known data may be used to help the BS 110 and/or UE 120 perform online training and refine the neural network parameters (weights and biases) for tailoring the neural network parameters to the specific environment in which the BS 110 and UE 120 have been deployed.

In some aspects, the indication of the resource allocation may be carried in at least one of a radio resource control (RRC) message, a downlink control information (DCI) communication, medium access control (MAC) control element (CE), or a combination thereof. As shown by reference number 310, the UE 120 may communicate with the BS 110 based at least in part on the resource allocation. Communicating with the BS 110 may include transmitting the known payload to the base station and/or receiving the known payload from the BS 110.

In some aspects, the resource allocation and corresponding communication may be configured, in accordance with various rules, specifications, and/or the like, so that both the BS 110 and the UE 120 can know and/or agree on the payload in advance of the communication so that the receiving entity can process the payload data (e.g., use the payload data in an ML process) without decoding the transmissions.

In some aspects, as indicated above, the BS 110 may transmit the indication of the resource allocation in an RRC message. In some aspects, the RRC message may include an indication of a scrambling seed. In some aspects, the RRC message may include a configuration of a scrambling seed generation process by which the UE may generate the scrambling seed. In some aspects, the UE 120 may generate the known payload based at least in part on the scrambling seed. In some aspects, generating the known payload based at least in part on the scrambling seed may include using the scrambling seed to generate bits to be encoded.

In some aspects, the data communication may include an uplink data communication, and the UE 120 may generate one or more padding bits, associated with the known payload, using the scrambling seed. For example, in some aspects, padding bits may be used when the transport block size allocation is larger than the number of bits available. In uplink communications, if the pad is large enough to be able to insert a buffer status report (BSR), a BSR may be inserted (which may be referred to as "padding-BSR"). In some aspects, a wireless communication standard, configuration, or dynamic indication may indicate that the known payloads not have pads (or not have pads large enough for a BSR) or that padding BSR is not to be used.

For example, the UE 120 may either generate the padding bits using the same scrambling seed proposed for known payloads or set the padding bits to zero. Additionally, or alternatively, as indicated above, some aspects include generating one or more padding bits associated with the known payload without including a buffer status report in the one or more padding bits.

In some aspects, as indicated above, the BS 110 may transmit the indication of the resource allocation in DCI. In some aspects, the DCI may include a radio network temporary identifier (RNTI) associated with the known payload. In some aspects, the DCI may include a DCI format associated with the known payload.

In some aspects, the communication may include transmitting or receiving the known payload using a dedicated logical channel. The dedicated logical channel may be subjected to certain priority and/or multiplexing rules. In some aspects, for example, the dedicated logical channel is not to be multiplexed with another logical channel. In some aspects, the dedicated logical channel is not to be transmitted on a transport block that includes a medium access control (MAC) control element.

In some aspects, the BS 110 and/or UE 120 may transmit the known payload according to a priority associated with the dedicated logical channel. The priority associated with the dedicated logical channel may be configured relative to a priority associated with another dedicated logical channel or channels. In some aspects, the priority associated with the dedicated logical channel may be lower relative to a priority associated with a user data communication. The user data may be carried on an uplink and/or downlink channel.

In some aspects, the transmitting entity (the UE 110 and/or the BS 110) may determine that a machine learning model associated with the machine learning process is out of date or demonstrating performance that fails to satisfy a performance threshold. The transmitting entity may transmit the known payload according to a priority associated with the dedicated logical channel, where the priority associated with the dedicated logical channel is higher relative to a priority associated with at least one other communication based at least in part on determining that the machine learning model associated with the machine learning process is out of date or demonstrating performance that fails to satisfy a performance threshold.

In some aspects, the transmitting and/or receiving entity may detect a collision between the communication associated with the dedicated logical channel and another communication. The transmitting and/or receiving entity may abandon the communication associated with the dedicated logical channel for a time period associated with the other communication based at least in part on detecting the collision. In some aspects, the indication of the resource allocation may indicate a dedicated semi-persistent scheduling grant onto which only the dedicated logical channel is to be mapped. In some aspects, the indication of the resource allocation may indicate a configured grant onto which only the dedicated logical channel is to be mapped.

As indicated above, FIG. 3 is provided as an example. Other examples may differ from what is described with regard to FIG. 3.

Figure 4:
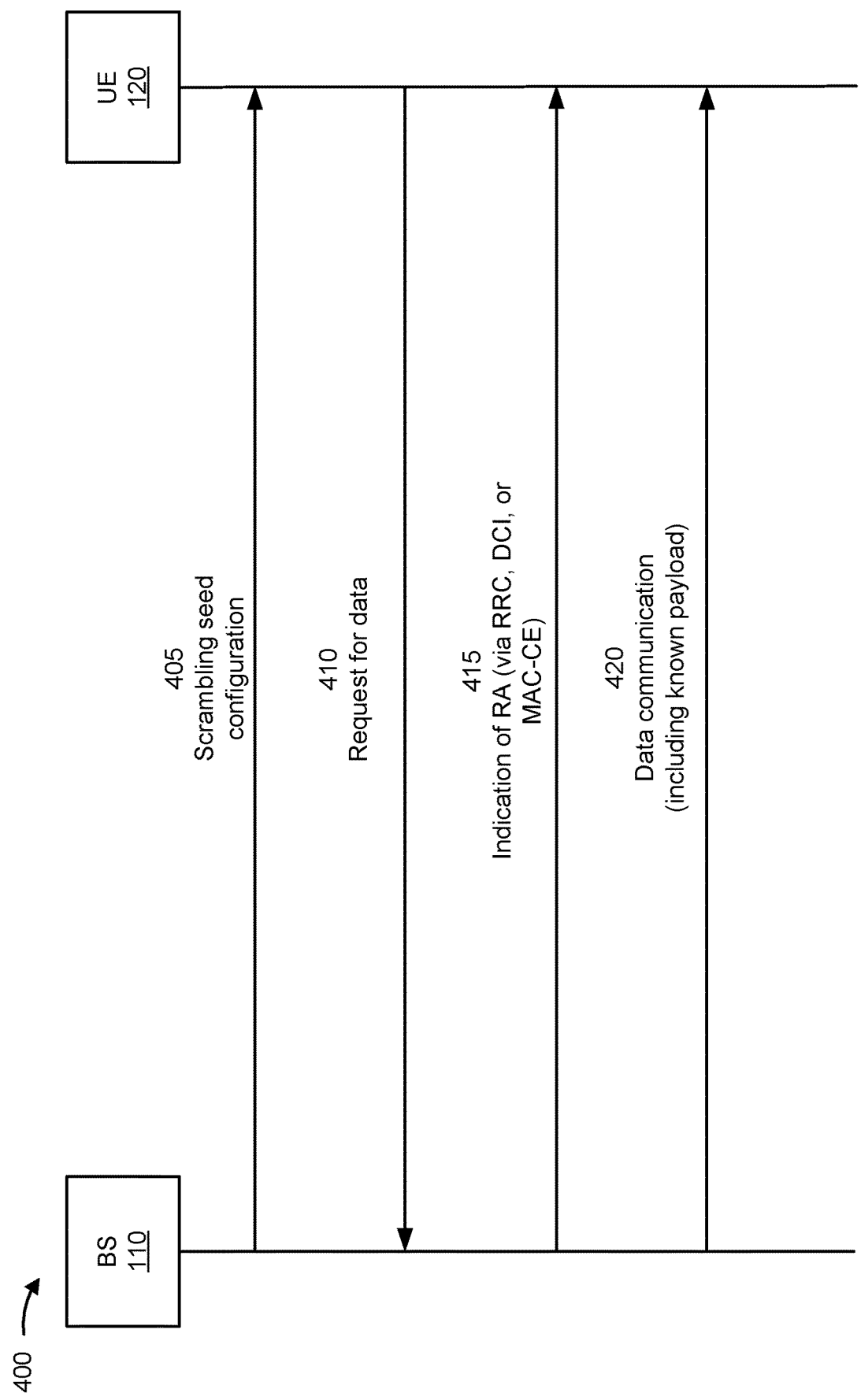
FIG. 4 is a diagram illustrating an example associated with communication of a known payload to support a machine learning process, in accordance with the present disclosure.

FIG. 4 is a diagram illustrating an example 400 associated with communication of a known payload to support a machine learning process, in accordance with the present disclosure. As shown in FIG. 4, a BS 110 and a UE 120 may communicate with one another.

As show by reference number 405, the BS 110 may transmit, and the UE 120 may receive, a scrambling seed configuration. The scrambling seed configuration may be transmitted using an RRC message. In some aspects, the RRC message may include an indication of a scrambling seed. In some aspects, the RRC message may include a configuration of a scrambling seed generation process by which the UE may generate the scrambling seed. In some aspects, the UE 120 may generate the known payload based at least in part on the scrambling seed. In some aspects, generating the known payload based at least in part on the scrambling seed may include using the scrambling seed to generate bits to be encoded.

As shown by reference number 410, the UE 120 may transmit, and the BS 110 may receive, a request for data. For example, the UE 120 may determine that a neural network hosted by the UE 120 is outdated and should be updated through training. The UE 120 may transmit the request for data based at least in part on that determination.

As shown by reference number 415, the BS 110 may transmit, and the UE 120 may receive, an indication of a resource allocation for a data communication having a known payload, as described above in connection with FIG. 3. As shown by reference 420, the BS 110 may transmit, and the UE 120 may receive, a data communication that includes the known payload. The UE 120 may use the data communication to update the neural network through a training process.

In some aspects, instead of a downlink data transfer, the data transfer may be an uplink transfer. For example, the BS 110 may determine that a neural network maintained at the BS 110 is outdated. The BS 110 may, based at least in part on that determination, transmit a resource allocation to the UE 120 without first sending a data request.

As indicated above, FIG. 4 is provided as an example. Other examples may differ from what is described with respect to FIG. 4.

Figure 5:
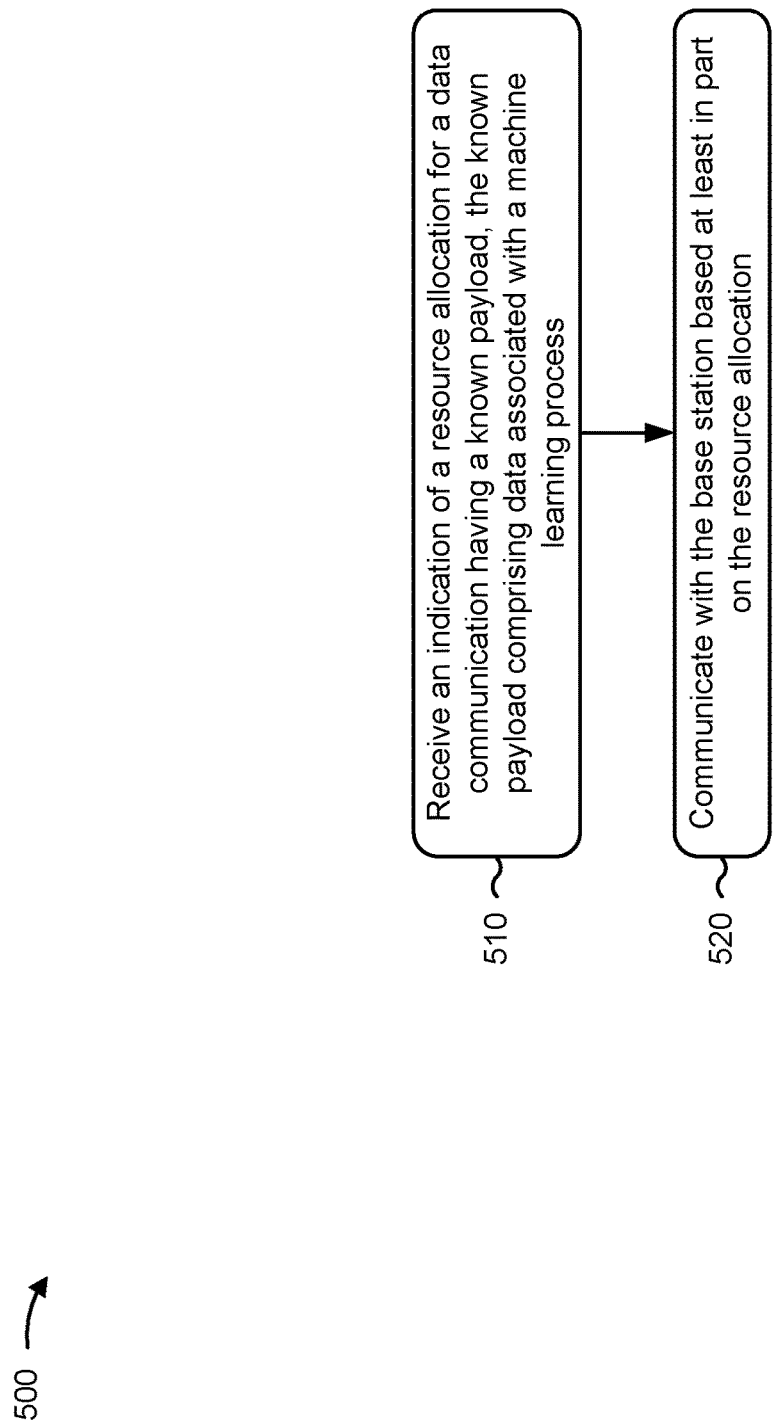
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with communication of a known payload to support an ML process.

As shown in FIG. 5, in some aspects, process 500 may include receiving, from a base station, an indication of a resource allocation for a data communication having a known payload, the known payload comprising data associated with a machine learning process (block 510). For example, the UE (e.g., using receive processor 258, controller/processor 280, memory 282, and/or the like) may receive, from a base station, an indication of a resource allocation for a data communication having a known payload, the known payload comprising data associated with a machine learning process, as described above.

As further shown in FIG. 5, in some aspects, process 500 may include communicating with the base station based at least in part on the resource allocation (block 520). For example, the UE (e.g., using receive processor 258, transmit processor 264, controller/processor 280, memory 282, and/or the like) may communicate with the base station based at least in part on the resource allocation, as described above.

Process 500 may include additional aspects, such as any single aspect or any combination of aspects described below and/or in connection with one or more other processes described elsewhere herein.

In a first aspect, receiving the indication of the resource allocation comprises receiving at least one of a radio resource control message, a medium access control (MAC) control element, or a downlink control information communication.

In a second aspect, alone or in combination with the first aspect, process 500 includes receiving, from the base station, an indication of a scrambling seed; and generating the known payload based at least in part on the scrambling seed, wherein communicating with the base station comprises transmitting the known payload to the base station or receiving the known payload from the base station.

In a third aspect, alone or in combination with the second aspect, the scrambling seed is carried in a radio resource control message.

In a fourth aspect, alone or in combination with one or more of the second through third aspects, generating the known payload based at least in part on the scrambling seed comprises using the scrambling seed to generate bits to be encoded.

In a fifth aspect, alone or in combination with one or more of the second through fourth aspects, the data communication comprises an uplink data communication, the method further comprising generating one or more padding bits, associated with the known payload, using the scrambling seed.

In a sixth aspect, alone or in combination with one or more of the first through fifth aspects, the data communication comprises an uplink data communication, the method further comprising generating one or more padding bits associated with the known payload, the one or more padding bits each has a value of zero.

In a seventh aspect, alone or in combination with one or more of the first through fifth aspects, the data communication comprises an uplink data communication, process 500 further including generating one or more padding bits associated with the known payload without including a buffer status report in the one or more padding bits.

In an eighth aspect, alone or in combination with one or more of the first through seventh aspects, communicating with the base station comprises transmitting or receiving the known payload using a dedicated logical channel.

In a ninth aspect, alone or in combination with the eighth aspect, the dedicated logical channel is not to be multiplexed with another logical channel.

In a tenth aspect, alone or in combination with one or more of the eighth through ninth aspects, uplink control information (UCI) is not to be carried by a physical uplink shared channel (PUSCH) communication that includes the known payload.

In an eleventh aspect, alone or in combination with one or more of the eighth through tenth aspects, the dedicated logical channel is not to be transmitted in a transport block that includes a medium access control (MAC) control element.

In a twelfth aspect, alone or in combination with one or more of the eighth through eleventh aspects, process 500 includes transmitting the known payload according to a priority associated with the dedicated logical channel, wherein the priority associated with the dedicated logical channel is configured relative to a priority associated with another dedicated logical channel.

In a thirteenth aspect, alone or in combination with one or more of the eighth through twelfth aspects, process 500 includes transmitting the known payload according to a priority associated with the dedicated logical channel, wherein the priority associated with the dedicated logical channel is lower relative to a priority associated with a user data communication.

In a fourteenth aspect, alone or in combination with one or more of the eighth through thirteenth aspects, process 500 includes transmitting the known payload according to a priority associated with the dedicated logical channel, wherein the priority associated with the dedicated logical channel is lower relative to a priority associated with a reference signal.

In a fifteenth aspect, alone or in combination with one or more of the eighth through fourteenth aspects, process 500 includes determining that a machine learning model associated with the machine learning process is out of date or demonstrating performance that fails to satisfy a performance threshold; and transmitting the known payload according to a priority associated with the dedicated logical channel, wherein the priority is associating with the dedicated logical channel is higher relative to a priority associated with at least one other communication based at least in part on determining that the machine learning model associated with the machine learning process is out of date or demonstrating performance that fails to satisfy a performance threshold.

In a sixteenth aspect, alone or in combination with one or more of the eighth through fifteenth aspects, process 500 includes detecting a collision between the communication associated with the dedicated logical channel and another communication; and abandoning the communication associated with the dedicated logical channel for a time period associated with the other communication based at least in part on detecting the collision.

In a seventeenth aspect, alone or in combination with one or more of the eighth through sixteenth aspects, the indication of the resource allocation indicates a dedicated semi-persistent scheduling grant onto which only the dedicated logical channel is to be mapped.

In an eighteenth aspect, alone or in combination with one or more of the eighth through seventeenth aspects, the indication of the resource allocation indicates a configured grant onto which only the dedicated logical channel is to be mapped.

In a nineteenth aspect, alone or in combination with one or more of the first through eighteenth aspects, the indication of the resource allocation indicates at least one of a periodic functionality of the dedicated logic channel, a semipersistent functionality of the dedicated logic channel, aperiodic functionality of the dedicated logic channel, or a combination thereof.

In a twentieth aspect, alone or in combination with one or more of the first through nineteenth aspects, receiving the indication of the resource allocation comprises receiving downlink control information (DCI), the DCI comprising a radio network temporary identifier associated with the known payload.

In a twenty-first aspect, alone or in combination with one or more of the first through twentieth aspects, receiving the indication of the resource allocation comprises receiving DCI, the DCI comprising a new DCI format associated with the known payload.

In a twenty-second aspect, alone or in combination with one or more of the first through twenty-first aspects, the data communication comprises a downlink data communication, the process 500 further comprising: receiving the downlink data communication, and processing the downlink data communication to extract the data associated with the machine learning process without decoding the downlink data communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with communication of a known payload to support a machine learning process.

As shown in FIG. 6, in some aspects, process 600 may include transmitting, to a UE, an indication of a resource allocation for a data communication having a known payload, the known payload comprising data associated with a machine learning process (block 610). For example, the base station (e.g., using transmit processor 220, controller/processor 240, memory 242, and/or the like) may transmit, to a UE, an indication of a resource allocation for a data communication having a known payload, the known payload comprising data associated with a machine learning process, as described above.

As further shown in FIG. 6, in some aspects, process 600 may include communicating with the UE based at least in part on the resource allocation (block 620). For example, the base station (e.g., using transmit processor 220, receive processor 238, controller/processor 240, memory 242, and/ or the like) may communicate with the UE based at least in part on the resource allocation, as described above.

Process 600 may include additional aspects, such as any single aspect or any combination of aspects described below and/or in connection with one or more other processes described elsewhere herein.

In a first aspect, transmitting the indication of the resource allocation comprises transmitting at least one of a radio resource control message, a MAC-CE, or a downlink control information communication.

In a second aspect, alone or in combination with the first aspect, process 600 includes transmitting, to the UE, an indication of a scrambling seed; and receiving, from the UE, the known payload, wherein the known payload is based at least in part on the scrambling seed.

In a third aspect, alone or in combination with the second aspect, the scrambling seed is carried in a radio resource control message.

In a fourth aspect, alone or in combination with one or more of the first through third aspects, the data communication comprises a downlink data communication, the process 600 further comprising generating one or more padding bits, associated with the known payload, using the scrambling seed.

In a fifth aspect, alone or in combination with one or more of the first through fourth aspects, the data communication comprises a downlink data communication, the process 600 further comprising generating one or more padding bits associated with the known payload, the one or more padding bits each has a value of zero.

In a sixth aspect, alone or in combination with one or more of the first through fifth aspects, communicating with the UE comprises transmitting or receiving the known payload using a dedicated logical channel.

In an seventh aspect, alone or in combination with the sixth aspect, the dedicated logical channel is not to be multiplexed with another logical channel.

In an eighth aspect, alone or in combination with one or more of the first through seventh aspects, the dedicated logical channel is not to be transmitted in a transport block that includes a medium access control (MAC) control element.

In a ninth aspect, alone or in combination with the eighth aspect, the process 600 includes transmitting the known payload according to a priority associated with the dedicated logical channel, wherein the priority associated with the dedicated logical channel is configured relative to a priority associated with another dedicated logical channel.

In a tenth aspect, alone or in combination with one or more of the eighth through ninth aspects, the process 600 includes transmitting the known payload according to a priority associated with the dedicated logical channel, wherein the priority associated with the dedicated logical channel is lower relative to a priority associated with a user data communication.

In an eleventh aspect, alone or in combination with one or more of the eighth through tenth aspects, the process 600 includes transmitting the known payload according to a priority associated with the dedicated logical channel, wherein the priority associated with the dedicated logical channel is lower relative to a priority associated with a reference signal.

In a twelfth aspect, alone or in combination with one or more of the eighth through eleventh aspects, process 600 includes determining that a machine learning model associated with the machine learning process is out of date or demonstrating performance that fails to satisfy a performance threshold; and transmitting the known payload according to a priority associated with the dedicated logical channel, wherein the priority is associating with the dedicated logical channel is higher relative to a priority associated with at least one other communication based at least in part on determining that the machine learning model associated with the machine learning process is out of date or demonstrating performance that fails to satisfy a performance threshold.

In a thirteenth aspect, alone or in combination with one or more of the eighth through twelfth aspects, process 600 includes detecting a collision between the communication associated with the dedicated logical channel and another communication; and abandoning the communication associated with the dedicated logical channel for a time period associated with the other communication based at least in part on detecting the collision.

In a fourteenth aspect, alone or in combination with one or more of the eighth through thirteenth aspects, the indication of the resource allocation indicates a dedicated semipersistent scheduling grant onto which only the dedicated logical channel is to be mapped.

In a fifteenth aspect, alone or in combination with one or more of the eighth through fourteenth aspects, the indication of the resource allocation indicates a configured grant onto which only the dedicated logical channel is to be mapped.

In a sixteenth aspect, alone or in combination with one or more of the eighth through fifteenth aspects, the indication of the resource allocation indicates at least one of a periodic functionality of the dedicated logic channel, a semipersistent functionality of the dedicated logic channel, a periodic functionality of the dedicated logic channel, or a combination thereof.

In an seventeenth aspect, alone or in combination with one or more of the eighth through sixteenth aspects, transmitting the indication of the resource allocation comprises transmitting DCI, the DCI comprising a radio network temporary identifier associated with the known payload.

In an eighteenth aspect, alone or in combination with one or more of the eighth through seventeenth aspects, transmitting the indication of the resource allocation comprises transmitting DCI, the DCI comprising a new DCI format associated with the known payload.

In a nineteenth aspect, alone or in combination with one or more of the first through eighteenth aspects, the data communication comprises an uplink data communication, the method further comprising: receiving the uplink data communication, and processing the uplink data communication to extract the data associated with the machine learning process without decoding the uplink data communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a user equipment (UE), comprising: receiving, from a base station, an indication of a resource allocation for a data communication having a known payload, the known payload comprising data associated with a machine learning process; and communicating with the base station based at least in part on the resource allocation.

Aspect 2: The method of aspect 1, wherein receiving the indication of the resource allocation comprises receiving at least one of a radio resource control message, a medium access control (MAC) control element, or a downlink control information communication.

Aspect 3: The method of either of aspects 1 or 2, further comprising: receiving, from the base station, an indication of a scrambling seed; and generating the known payload based at least in part on the scrambling seed, wherein communicating with the base station comprises transmitting the known payload to the base station or receiving the known payload from the base station.

Aspect 4: The method of aspect 3, wherein the scrambling seed is carried in a radio resource control message.

Aspect 5: The method of either of aspects 3 or 4, wherein generating the known payload based at least in part on the scrambling seed comprises using the scrambling seed to generate bits to be encoded.

Aspect 6: The method of any of aspects 3-5, wherein the data communication comprises an uplink data communication, the method further comprising generating one or more padding bits, associated with the known payload, using the scrambling seed.

Aspect 7: The method of any of aspects 1-5, wherein the data communication comprises an uplink data communication, the method further comprising generating one or more padding bits associated with the known payload, wherein the one or more padding bits each has a value of zero.

Aspect 8: The method of any of aspects 1-5, wherein the data communication comprises an uplink data communication, the method further comprising generating one or more padding bits associated with the known payload without including a buffer status report in the one or more padding bits.

Aspect 9: The method of any of aspects 1-8, wherein communicating with the base station comprises transmitting or receiving the known payload using a dedicated logical channel.

Aspect 10: The method of aspect 9, wherein the dedicated logical channel is not to be multiplexed with another logical channel.

Aspect 11: The method of either of aspects 9 or 10, wherein uplink control information (UCI) is not to be carried by a physical uplink shared channel (PUSCH) communication that includes the known payload.

Aspect 12: The method of any of aspects 9-11, wherein the dedicated logical channel is not to be transmitted in a transport block that includes a medium access control (MAC) control element.

Aspect 13: The method of any of aspects 9-12, further comprising transmitting the known payload according to a priority associated with the dedicated logical channel, wherein the priority associated with the dedicated logical channel is configured relative to a priority associated with another dedicated logical channel.

Aspect 14: The method of any of aspects 9-13, further comprising transmitting the known payload according to a priority associated with the dedicated logical channel, wherein the priority associated with the dedicated logical channel is lower relative to a priority associated with a user data communication.

Aspect 15: The method of any of aspects 9-14, further comprising transmitting the known payload according to a priority associated with the dedicated logical channel, wherein the priority associated with the dedicated logical channel is lower relative to a priority associated with a reference signal.

Aspect 16: The method of any of aspects 9-15, further comprising: determining that a machine learning model associated with the machine learning process is out of date or demonstrating performance that fails to satisfy a performance threshold; and transmitting the known payload according to a priority associated with the dedicated logical channel, wherein the priority associated with the dedicated logical channel is higher relative to a priority associated with at least one other communication based at least in part on determining that the machine learning model associated with the machine learning process is out of date or demonstrating performance that fails to satisfy a performance threshold.

Aspect 17: The method of any of aspects 9-16, further comprising: detecting a collision between the communication associated with the dedicated logical channel and another communication; and abandoning the communication associated with the dedicated logical channel for a time period associated with the other communication based at least in part on detecting the collision.

Aspect 18: The method of any of aspects 9-17, wherein the indication of the resource allocation indicates a dedicated semi-persistent scheduling grant onto which only the dedicated logical channel is to be mapped.

Aspect 19: The method of any of aspects 9-17, wherein the indication of the resource allocation indicates a configured grant onto which only the dedicated logical channel is to be mapped.

Aspect 20: The method of any of aspects 1-19, wherein the indication of the resource allocation indicates at least one of a periodic functionality of the dedicated logic channel, a semipersistent functionality of the dedicated logic channel, aperiodic functionality of the dedicated logic channel, or a combination thereof.

Aspect 21: The method of any of aspects 1-20, wherein receiving the indication of the resource allocation comprises receiving downlink control information (DCI), the DCI comprising a radio network temporary identifier associated with the known payload.

Aspect 22: The method of any of aspects 1-21, wherein receiving the indication of the resource allocation comprises receiving downlink control information (DCI), the DCI comprising a new DCI format associated with the known payload.

Aspect 23: The method of any of aspects 1-22, wherein the data communication comprises a downlink data communication, the method further comprising: receiving the downlink data communication; and processing the downlink data communication to extract the data associated with the machine learning process without decoding the downlink data communication.

Aspect 24: A method of wireless communication performed by a base station, comprising: transmitting, to a user equipment (UE), an indication of a resource allocation for a data communication having a known payload, the known payload comprising data associated with a machine learning process; and communicating with the UE based at least in part on the resource allocation.

Aspect 25: The method of aspect 24, wherein transmitting the indication of the resource allocation comprises transmitting at least one of a radio resource control message, a medium access control (MAC) control element, or a downlink control information communication.

Aspect 26: The method of either of aspects 24 or 25, further comprising: transmitting, to the UE, an indication of a scrambling seed; and receiving, from the UE, the known payload, wherein the known payload is based at least in part on the scrambling seed.

Aspect 27: The method of aspect 26, wherein the scrambling seed is carried in a radio resource control message.

Aspect 28: The method of aspect 24, wherein the data communication comprises a downlink data communication, the method further comprising generating one or more padding bits, associated with the known payload, using the scrambling seed.

Aspect 29: The method of any of aspects 24-28, wherein the data communication comprises a downlink data communication, the method further comprising generating one or more padding bits associated with the known payload, wherein the one or more padding bits each has a value of zero.

Aspect 30: The method of any of aspects 24-29, wherein communicating with the UE comprises transmitting or receiving the known payload using a dedicated logical channel.

Aspect 31: The method of aspect 30, wherein the dedicated logical channel is not to be multiplexed with another logical channel.

Aspect 32: The method of either of aspects 30 or 31, wherein the dedicated logical channel is not to be transmitted in a transport block that includes a medium access control (MAC) control element.

Aspect 33: The method of any of aspects 30-32, further comprising transmitting the known payload according to a priority associated with the dedicated logical channel, wherein the priority associated with the dedicated logical channel is configured relative to a priority associated with another dedicated logical channel.

Aspect 34: The method of any of aspects 30-33, further comprising transmitting the known payload according to a priority associated with the dedicated logical channel, wherein the priority associated with the dedicated logical channel is lower relative to a priority associated with a user data communication.

Aspect 35: The method of any of aspects 30-34, further comprising transmitting the known payload according to a priority associated with the dedicated logical channel, wherein the priority associated with the dedicated logical channel is lower relative to a priority associated with a reference signal.

Aspect 36: The method of any of aspects 30-35, further comprising: determining that a machine learning model associated with the machine learning process is out of date or demonstrating performance that fails to satisfy a performance threshold; and transmitting the known payload according to a priority associated with the dedicated logical channel, wherein the priority associated with the dedicated logical channel is higher relative to a priority associated with at least one other communication based at least in part on determining that the machine learning model associated with the machine learning process is out of date or demonstrating performance that fails to satisfy a performance threshold.

Aspect 37: The method of any of aspects 30-36, further comprising: detecting a collision between the communication associated with the dedicated logical channel and another communication; and abandoning the communication associated with the dedicated logical channel for a time period associated with the other communication based at least in part on detecting the collision.

Aspect 38: The method of any of aspects 30-37, wherein the indication of the resource allocation indicates a dedicated semi-persistent scheduling grant onto which only the dedicated logical channel is to be mapped.

Aspect 39: The method of any of aspects 30-38, wherein the indication of the resource allocation indicates a configured grant onto which only the dedicated logical channel is to be mapped.

Aspect 40: The method of any of aspects 30-39, wherein the indication of the resource allocation indicates at least one of a periodic functionality of the dedicated logic channel, a semipersistent functionality of the dedicated logic channel, aperiodic functionality of the dedicated logic channel, or a combination thereof.

Aspect 41: The method of any of aspects 30-40, wherein transmitting the indication of the resource allocation comprises transmitting downlink control information (DCI), the DCI comprising a radio network temporary identifier associated with the known payload.

Aspect 42: The method of any of aspects 30-41, wherein transmitting the indication of the resource allocation comprises transmitting downlink control information (DCI), the DCI comprising a new DCI format associated with the known payload.

Aspect 43: The method of any of aspects 24-42, wherein the data communication comprises an uplink data communication, the method further comprising: receiving the uplink data communication; and processing the uplink data communication to extract the data associated with the machine learning process without decoding the uplink data communication.

Aspect 44: An apparatus for wireless communication at a device, comprising a processor; memory coupled with the processor; and instructions stored in the memory and executable by the processor to cause the apparatus to perform the method of one or more aspects of aspects 1-23.

Aspect 45: A device for wireless communication, comprising a memory and one or more processors coupled to the memory, the memory and the one or more processors configured to perform the method of one or more aspects of aspects 1-23.

Aspect 46: An apparatus for wireless communication, comprising at least one means for performing the method of one or more aspects of aspects 1-23.

Aspect 47: A non-transitory computer-readable medium storing code for wireless communication, the code comprising instructions executable by a processor to perform the method of one or more aspects of aspects 1-23.

Aspect 48: A non-transitory computer-readable medium storing a set of instructions for wireless communication, the set of instructions comprising one or more instructions that, when executed by one or more processors of a device, cause the device to perform the method of one or more aspects of aspects 1-23.

Aspect 49: An apparatus for wireless communication at a device, comprising a processor; memory coupled with the processor; and instructions stored in the memory and executable by the processor to cause the apparatus to perform the method of one or more aspects of aspects 24-43.

Aspect 50: A device for wireless communication, comprising a memory and one or more processors coupled to the memory, the memory and the one or more processors configured to perform the method of one or more aspects of aspects 24-43.

Aspect 51: An apparatus for wireless communication, comprising at least one means for performing the method of one or more aspects of aspects 24-43.

Aspect 52: A non-transitory computer-readable medium storing code for wireless communication, the code comprising instructions executable by a processor to perform the method of one or more aspects of aspects 24-43.

Aspect 53: A non-transitory computer-readable medium storing a set of instructions for wireless communication, the set of instructions comprising one or more instructions that, when executed by one or more processors of a device, cause the device to perform the method of one or more aspects of aspects 24-43.

The foregoing disclosure provides illustration and description, but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, from a network node, an indication of a resource allocation for a data communication having a known payload, the known payload comprising data associated with a machine learning process; and
      transmit or receive, with the network node, the known payload using a dedicated logical channel based at least in part on the resource allocation,
      wherein at least one of:
         the dedicated logical channel is not to be multiplexed with another logical channel,
         uplink control information (UCI) is not to be carried by a physical uplink shared channel (PUSCH) communication that includes the known payload,
         the dedicated logical channel is not to be transmitted in a transport block that includes a medium access control (MAC) control element (CE), or
         the one or more processors are further configured to transmit the known payload according to a first priority, associated with the dedicated logical channel and that is higher relative to a second priority associated with at least one other communication, based at least in part on a machine learning model, associated with the machine learning process, being out of date or demonstrating a performance failing to satisfy a performance threshold.

2. The UE of claim 1, wherein the one or more processors, when receiving the indication of the resource allocation, are configured to receive at least one of a radio resource control message, the MAC CE, or a downlink control information communication.

3. The UE of claim 1, wherein the one or more processors are further configured to:
   receive, from the network node, an indication of a scrambling seed; and
   generate the known payload based at least in part on the scrambling seed,
      wherein the one or more processors, when transmitting or receiving the known payload, are configured to transmit the known payload to the network node or receive the known payload from the network node.

4. The UE of claim 3, wherein the one or more processors, when generating the known payload based at least in part on the scrambling seed, are configured to use the scrambling seed to generate bits to be encoded.

5. The UE of claim 3, wherein the data communication comprises an uplink data communication, and wherein the one or more processors are further configured to generate one or more padding bits, associated with the known payload, using the scrambling seed.

6. The UE of claim 1, wherein the data communication comprises an uplink data communication, and wherein the one or more processors are further configured to generate one or more padding bits associated with the known payload, wherein the one or more padding bits each has a value of zero.

7. The UE of claim 1, wherein the data communication comprises an uplink data communication, and wherein the one or more processors are further configured to generate one or more padding bits associated with the known payload without including a buffer status report in the one or more padding bits.

8. The UE of claim 1, wherein the dedicated logical channel is not to be multiplexed with the other logical channel.

9. The UE of claim 1, wherein the UCI is not to be carried by the PUSCH, and wherein the dedicated logical channel is not to be transmitted in the transport block.

10. The UE of claim 1, wherein the one or more processors are further configured to transmit the known payload according to a third priority associated with the dedicated logical channel, wherein the third priority associated with the dedicated logical channel is configured relative to a fourth priority associated with another dedicated logical channel.

11. The UE of claim 1, wherein the one or more processors are further configured to transmit the known payload according to a third priority associated with the dedicated logical channel, wherein the third priority associated with the dedicated logical channel is lower relative to a fourth priority associated with at least one of: a user data communication or a reference signal.

12. The UE of claim 1, wherein the one or more processors are further configured to:
    determine that the machine learning model associated with the machine learning process is out of date or is demonstrating the performance fails to satisfy the performance threshold; and
    transmit the known payload according to the first priority based at least in part on determining that the machine learning model associated with the machine learning process is out of date or is demonstrating the performance fails to satisfy the performance threshold.

13. The UE of claim 1, wherein the one or more processors are further configured to:
    detect a collision between the data communication and the at least one other communication; and
    abandon the data communication for a time period associated with the at least one other communication based at least in part on detecting the collision.

14. The UE of claim 1, wherein the indication of the resource allocation indicates at least one of:
    a dedicated semi-persistent scheduling grant onto which only the dedicated logical channel is to be mapped, or
    a configured grant onto which only the dedicated logical channel is to be mapped.

15. The UE of claim 1, wherein the indication of the resource allocation indicates at least one of a periodic functionality of the dedicated logical channel, a semipersistent functionality of the dedicated logical channel, aperiodic functionality of the dedicated logic logical channel, or a combination thereof.

16. The UE of claim 1, wherein the one or more processors, when receiving the indication of the resource allocation, are configured to receive downlink control information (DCI), the DCI comprising at least one of:
- a radio network temporary identifier associated with the known payload, or
- a new DCI format associated with the known payload.

17. The UE of claim 1, wherein the data communication comprises a downlink data communication, and wherein the one or more processors are further configured to:
- receive the downlink data communication; and
- process the downlink data communication to extract the data associated with the machine learning process without decoding the downlink data communication.

18. A network node for wireless communication, comprising:
a memory; and
one or more processors coupled to the memory, the one or more processors configured to:
- transmit, to a user equipment (UE), an indication of a resource allocation for a data communication having a known payload, the known payload comprising data associated with a machine learning process; and
- transmit or receive, with the UE, the known payload using a dedicated logical channel based at least in part on the resource allocation,
  wherein at least one of:
    the dedicated logical channel is not to be multiplexed with another logical channel,
    the dedicated logical channel is not to be transmitted in a transport block that includes a medium access control (MAC) control element (CE), or
    the one or more processors are further configured to transmit the known payload according to a first priority, associated with the dedicated logical channel and that is higher relative to a second priority associated with at least one other communication, based at least in part on a machine learning model, associated with the machine learning process, being out of date or demonstrating a performance failing to satisfy a performance threshold.

19. The network node of claim 18, wherein the one or more processors are further configured to:
- transmit, to the UE, an indication of a scrambling seed; and
- receive, from the UE, the known payload, wherein the known payload is based at least in part on the scrambling seed.

20. The network node of claim 19, wherein the data communication comprises a downlink data communication, and wherein the one or more processors are further configured to:
- generate one or more padding bits, associated with the known payload, using the scrambling seed, or
- set one or more padding bits to zero.

21. The network node of claim 18, wherein the dedicated logical channel is not to be multiplexed with the other logical channel, and wherein the dedicated logical channel is not to be transmitted in the transport block.

22. The network node of claim 18, wherein the one or more processors are further configured to transmit the known payload according to a third priority associated with the dedicated logical channel, wherein the third priority associated with the dedicated logical channel is configured relative to a fourth priority associated with another dedicated logical channel.

23. The network node of claim 18, wherein the one or more processors are further configured to transmit the known payload according to a third priority associated with the dedicated logical channel, wherein the third priority associated with the dedicated logical channel is lower relative to a fourth priority associated with at least one of: a user data communication or a reference signal.

24. The network node of claim 18, wherein the one or more processors are further configured to:
- determine that the machine learning model associated with the machine learning process is out of date or is demonstrating the performance fails to satisfy the performance threshold; and
- transmit the known payload according to the first priority based at least in part on determining that the machine learning model associated with the machine learning process is out of date or is demonstrating the performance fails to satisfy the performance threshold.

25. The network node of claim 18, wherein the one or more processors are further configured to:
- detect a collision between the data communication and the at least one other communication; and
- abandon the data communication for a time period associated with the at least one other communication based at least in part on detecting the collision.

26. The network node of claim 18, wherein the one or more processors, when transmitting the indication of the resource allocation, are configured to transmit downlink control information (DCI), the DCI comprising at least one of:
- a radio network temporary identifier associated with the known payload, or
- a new DCI format associated with the known payload.

27. The network node of claim 18, wherein the data communication comprises an uplink data communication, and wherein the one or more processors are further configured to:
- receive the uplink data communication; and
- process the uplink data communication to extract the data associated with the machine learning process without decoding the uplink data communication.

28. A method of wireless communication performed by a user equipment (UE), comprising:
- receiving, from a network node, an indication of a resource allocation for a data communication having a known payload, the known payload comprising data associated with a machine learning process; and
- transmitting or receiving, with the network node, the known payload using a dedicated logical channel based at least in part on the resource allocation,
  wherein at least one of:
    the dedicated logical channel is not to be multiplexed with another logical channel,
    uplink control information (UCI) is not to be carried by a physical uplink shared channel (PUSCH) communication that includes the known payload,
    the dedicated logical channel is not to be transmitted in a transport block that includes a medium access control (MAC) control element (CE), or the method further comprises transmitting the known payload according to a first priority, associated with the dedicated logical channel and that is higher relative to a second priority associated with at least one other communication, based at least in part on a machine learning model, associated with the machine learning process, being out of date or demonstrating a performance failing to satisfy a performance threshold.

29. The method of claim 28, wherein receiving the indication of the resource allocation comprises receiving at least one of a radio resource control message, the MAC CE control element, or a downlink control information communication.

30. A method of wireless communication performed by a network node, comprising:
transmitting, to a user equipment (UE), an indication of a resource allocation for a data communication having a known payload, the known payload comprising data associated with a machine learning process; and
transmitting or receiving, with the UE, the known payload using a dedicated logical channel based at least in part on the resource allocation,
wherein at least one of:
the dedicated logical channel is not to be multiplexed with another logical channel,
the dedicated logical channel is not to be transmitted in a transport block that includes a medium access control (MAC) control element (CE), or
the method further comprises transmitting the known payload according to a first priority, associated with the dedicated logical channel and that is higher relative to a second priority associated with at least one other communication, based at least in part on a machine learning model, associated with the machine learning process, being out of date or demonstrating a performance failing to satisfy a performance threshold.

* * * * *